Figure 1:
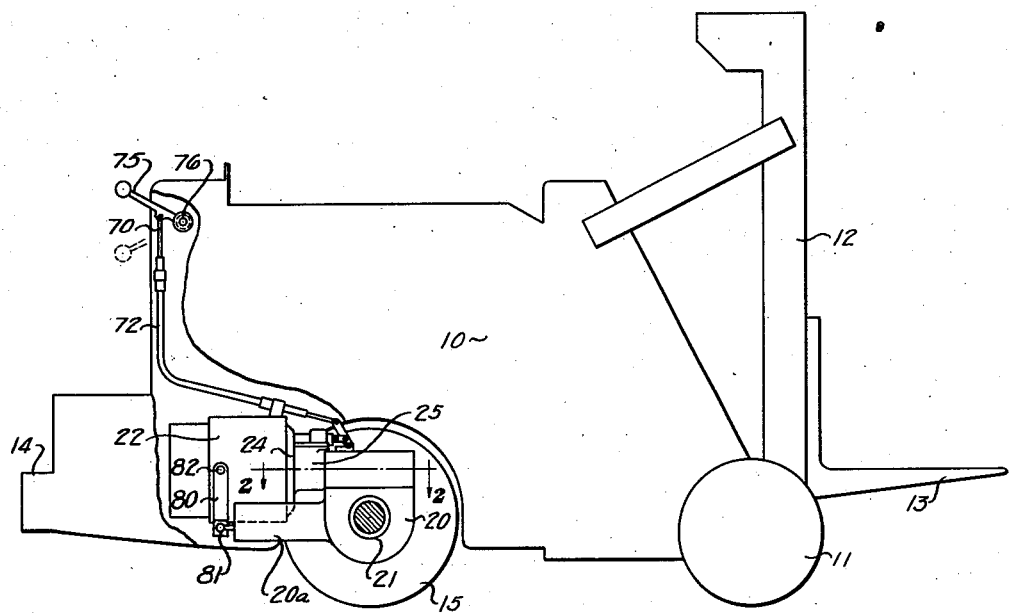

Dec. 2, 1941.  S. K. TOWSON  2,264,730
POWER UNIT FOR INDUSTRIAL TRUCKS
Filed Dec. 30, 1939  2 Sheets-Sheet 1

INVENTOR.
SHELDON K. TOWSON
BY
ATTORNEYS

Dec. 2, 1941.  S. K. TOWSON  2,264,730
POWER UNIT FOR INDUSTRIAL TRUCKS
Filed Dec. 30, 1939  2 Sheets—Sheet 2

INVENTOR.
SHELDON K. TOWSON
BY
ATTORNEYS.

Patented Dec. 2, 1941

2,264,730

UNITED STATES PATENT OFFICE 2,264,730

POWER UNIT FOR INDUSTRIAL TRUCKS

Sheldon K. Towson, Cleveland Heights, Ohio, assignor to The Elwell-Parker Electric Co., Cleveland, Ohio, a corporation of Ohio Application December 30, 1939, Serial No. 311,731

4 Claims. (Cl. 180—57)

This invention is directed to improvements in the power units of industrial trucks of the electrically-powered type, and the general purpose thereof is the provision of a compact motor-driven balanced two-speed transmission unit, which is adaptable for use on standard sized industrial trucks.

Another object of the invention is the provision of a specifically arranged balanced two-speed motor drive for an industrial truck, wherein the transmission gears are arranged in duplex fashion immediately adjacent to or within a motor casing in an opposed manner, whereby the reactive stresses upon the bearings of the mechanism, including the motor bearings, is distributed to thereby permit the use of chassis bearings and gears of considerably less dimension and strength than otherwise would be necessary.

A still further object of the present invention is the provision of a compact two-speed transmission mechanism for an electric motor-driven industrial truck, which can be efficiently arranged between the motor structure and the main reduction gearing of the axle transmission of the truck in such compact manner that the motor casing, a selective gear transmission casing and the reduction gear transmission casing may constitute a unitary assembly which can be joined directly to the axle housing of the truck.

Other objects of my invention will become apparent to those skilled in the art from the description of an embodiment thereof illustrated in the drawings. The essential characteristics of the invention are summarized in the claims.

Figure 5:
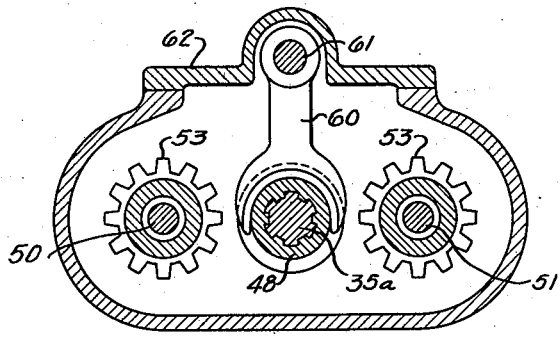
Figure 3:
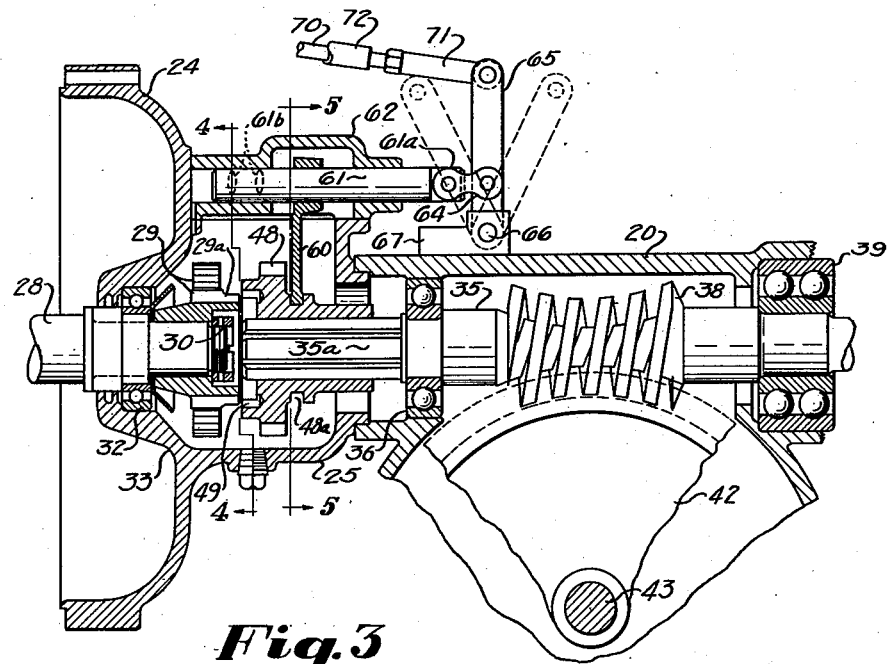
Figure 4:
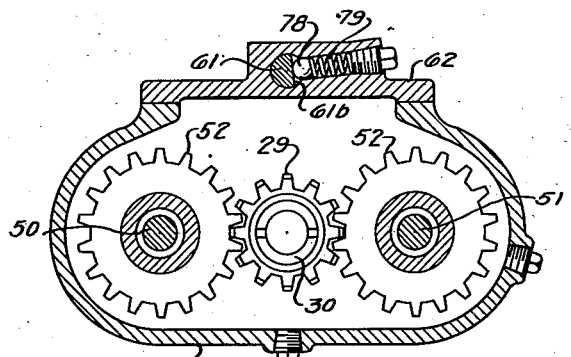
Figure 2:
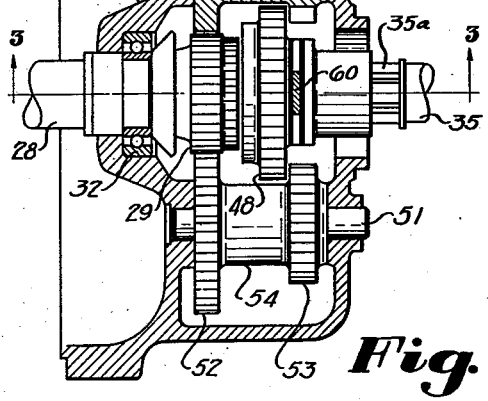

In the drawings, Fig. 1 is a side elevational view of an electrically powered industrial truck equipped with a power unit embodying the features of my invention; Fig. 2 is an enlarged cross-sectional view taken horizontally through a portion of the power unit shown in position on the truck in Fig. 1; Fig. 3 is a cross-sectional view corresponding substantially to the line 3—3 of Fig. 2; Fig. 4 is a fragmentary cross-sectional view, taken substantially along the line 4—4 of Fig. 3; and Fig. 5 is a cross-sectional view, similar to Fig. 4, but taken substantially along the line 5—5 of Fig. 3.

It has been customary heretofore, in the construction of industrial trucks of the electrically powered type, to provide a low voltage motor powered from batteries, which, by reason of the low voltage, involved a motor construction of considerable bulk. The motor was connected to a wheel drive of the vehicle usually comprising or involving the use of a worm gear reduction, in the form of a worm upon the motor shaft and a worm gear on the truck axle. Demands for constantly increasing load-handling capacities have brought about many new problems in the design and construction of industrial trucks, primarily for the reason that the overall bulk or dimensions of the truck are restricted to minimum aisle clearances with maximum maneuverability of the truck, thus restricting the amount of bulk space available for increased battery capacity and bulk space allowable for any increases in the size of the motor and associated gearing. When the loads on such electrically powered trucks were increased, the trucks were reduced in load transporting speeds on factory ramps and inclines to such an extent as to interfere with the efficient traffic operation of the truck. To overcome this deficiency while confining the power unit of the truck to the present available bulk space for a power unit, I have provided a transmission confined to a space between the motor casing and the worm gear reduction mechanism of the truck, comprising pairs of balanced change speed gears in diametrically opposed positions to eliminate the necessity of increasing the sizes of the bearings for the motor sizes of the intermediate shafts and the sizes of the gears usually involved in the construction of a two-speed mechanism.

The entire arrangement is such that the motor, two-speed transmission and the worm gear reduction mechanism can be compactly constructed as a unitary assembly whereby the casings thereof may comprise a torque arm which may be suitably pivotally connected to the truck chassis.

Referring to the drawings, I show an industrial truck comprising a frame or body 10, mounted upon a pair of wheels 11 attached to the truck frame adjacent an upright structure 12 which is vertically traversed by a load-elevating means 13. The operator's end of the truck is provided with a platform 14 overhanging one end thereof and a pair of traction wheels 15 are driven by the power unit.

The casings for the power unit comprise a worm gear reduction housing 20 mounted upon the axle housing 21, an electric motor housing 22, resting upon and secured to an arm 20a secured to or forming an integral part of the housing structure 20 and a speed gear casing 25 disposed between the motor housing 22 and the worm gear housing 20. The housing structure 22 of the motor is such that an end bell 24 thereof may be formed to also comprise the housing 25 for the change speed gear mechanism which will now be described.

In Figs. 2, 3 and 4 of the drawings I show the motor shaft 28 as being provided on the end thereof with a driving pinion 29 suitably keyed to and held upon the end of the motor shaft by a nut 30. The pinion 29 is disposed immediately adjacent to a motor shaft bearing 32 carried by an inset formation 33 of the end bell 24 of the motor housing. Mounted in alignment with the motor shaft 28 is a splined driven shaft member 35, the splined end 35a thereof overhanging a bearing mounting 36 carried by the worm gear housing 20. The shaft 35 has a worm 38 formed thereon and the outer end of the shaft is supported by a bearing 39 carried by the gear housing 20 and in which is disposed the worm gear 42. As shown, the worm gear 42 is mounted upon the truck axle member 43, the latter being supported by suitable bearings (not shown) disposed in the axle housing 21.

Shiftably mounted upon the splined end 35a of the worm shaft 35 is a gear member 48, provided with internal clutch teeth 49, which, in one shifted position of the gear 48, engage extensions 29a of the gear teeth formed on the motor pinion 29. Disposed diametrically opposite the pinion on each side of the motor shaft 28 and worm shaft 35 are non-rotating stub shafts 50 and 51 carried by the housing structure 25, and upon which are rotatively mounted gear members 52 in constant mesh with the motor pinion 29. The gear members 52 may be integrally connected with gear members 53 by sleeve portions 54. The gear members 53 are adapted to have the teeth thereof mesh with the teeth of the shiftable gear member 48, when the latter gear member is in a disconnected position relative to the teeth 29a of the motor pinion 29.

The shifting operation of the slide gear 48 is effected by a yoke member 60 engaging in a groove 48a formed on the slide gear 48. The upper end of the yoke member 60 is secured to a slide bar 61, suitably mounted in a cover structure 62, which encloses the gear housing 25. The outer end 61a of the shipper bar 61 is bifurcated to pivotally engage a link 64 which is attached to a rockable arm 65 pivotally secured at its lower end 66 to a block 67 mounted upon the worm gear housing 20. The upper end of the rocker arm 65 is attached to a flexible shaft 70 by an adjustable link connection 71.

As shown in Fig. 1, the flexible shaft member 70 is carried by a housing 72 which extends upwardly at the operator's end of the truck, whereby the shipper shaft 61 may be attached to a gear shift lever 75, pivotally connected at 76 to the upper portion of the truck frame. A conventional detent mechanism for holding the gear 48 in either one of its operative positions is shown in Fig. 4, as comprising a ball member 78 pressed by a spring 79 into one or the other of the spaced-apart notches 61b formed in the member 61. The ball and spring are maintained in a properly located base formed in the cover structure 62 and normal to the bar 61.

The speed reduction ratio obtained by reason of the difference in the pitch diameter of the motor pinions 29 and the pairs of gears 52 and between the pitch diameter of the gears 53 and the large slide gear 48, is about 2¼ obtained when the slide gear 48 is disengaged from the motor pinion 29 and shifted into engagement with the teeth of the gear members 53. The disposition of the speed change gears in the position shown, that is, intermediate the motor and the worm gear reduction mechanism permits of an extremely compact arrangement of the related elements and the control mechanism may comprise the simple arrangement disclosed. As described, the motor casing, the change speed gear housing and worm gear housing, can be assembled as a unit. Hence, the entire housing structure can be utilized as a torque arm in the manner which I have illustrated in Fig. 1, wherein an extension 20a is shown as being formed upon the worm gear housing 20 and extending rearwardly toward the operator's end of the truck. A yoke member 80 is shaped to span the lower half of the motor housing 22 and a ball and socket connection, generally indicated by the reference numeral 81, is provided between the lower end of the yoke member 80 and the end of the extension 20a. The extension 20a serves also as an additional support for the motor housing and for maintaining alignment of the motor shaft and worm shaft. The upper ends 82 of the two arms of the yoke member 80 may be conveniently attached to side frame members (not shown) of the truck frame structure, in any convenient manner. This arrangement permits of the absorption of overrun shock, thus protecting the teeth of the worm gear 42 against damage when unusual stresses are suddenly exerted thereon.

I claim:

1. A power unit for an industrial truck, having in combination an electric motor, the casing of which has an extension of reduced height formed integrally therewith and forming a gear housing, said casing having a reentrant formation, a bearing within said formation supporting the motor shaft, a pinion mounted upon said shaft adjacent said formation, a selective speed reduction gear means including a slide gear mounted in alignment with said pinion within said extension and pairs of speed reduction gears disposed within said casing extension on opposite sides of the slide gear and the motor pinion.

2. A power unit for an industrial truck, having in combination an electric motor, the casing of which has an extension of reduced overall height formed integrally therewith and forming a gear housing, a pinion mounted upon the shaft end of the motor and disposed within said housing, a selective speed reduction gear means including a slide gear mounted in alignment with the motor pinion within said extension, pairs of speed reduction gears disposed within said extension on opposite sides of the slide gear and the motor pinion, and means for shifting said slide gear without shifting said speed reduction gears, said means comprising a yoke member, a slide bar disposed above said motor shaft in parallel alignment therewith, said yoke being secured to said slide, and means for reciprocating said slide bar.

3. A power unit for an industrial truck, having in combination an electric motor, a casing for said motor, said casing having an extension formed integrally therewith and forming a gear housing, a second gear housing secured to said extension, and torque means interconnecting the truck frame structure and said second gear housing, said means comprising a yoke member connected to the truck frame structure and an arm extending from said second gear housing and pivotally connected to said yoke.

4. A power unit for an industrial truck, having in combination an electric motor, a casing for said motor, said casing having an extension formed integrally therewith and forming a gear housing, a second gear housing secured to said extension, and torque means interconnecting the truck frame structure and said second gear housing, said means comprising a yoke member secured to the truck frame structure and spanning the motor casing, an arm extending from said second gear housing and forming a support for said motor casing, and a ball and socket connection between said yoke and arm.

SHELDON K. TOWSON.